United States Patent [19]

Saxby

[11] Patent Number: 5,270,124
[45] Date of Patent: Dec. 14, 1993

[54] COMPOSITE ROLL

[75] Inventor: Peter R. Saxby, Whyalla, Australia

[73] Assignee: The Broken Hill Proprietary Co., Ltd., Melbourne, Australia

[21] Appl. No.: 778,093

[22] PCT Filed: Jul. 2, 1990

[86] PCT No.: PCT/AU90/00282
§ 371 Date: Dec. 12, 1991
§ 102(e) Date: Dec. 12, 1991

[87] PCT Pub. No.: WO91/00371
PCT Pub. Date: Jan. 10, 1991

[30] Foreign Application Priority Data

Jun. 30, 1989 [AU] Australia .................. PJ5024

[51] Int. Cl.⁵ ............................................ B32B 15/00
[52] U.S. Cl. ................................... 428/683; 428/685
[58] Field of Search ................ 428/683, 685; 420/69, 420/101, 111

[56] References Cited

U.S. PATENT DOCUMENTS 4,110,514 8/1978 Nicholson .................... 428/683

FOREIGN PATENT DOCUMENTS

| 1001131 | 2/1952 | France . |
| 55-79857 | 12/1978 | Japan . |
| 56-152945 | 4/1980 | Japan . |
| 57-85953 | 11/1980 | Japan . |
| 59-179762 | 10/1984 | Japan . |
| 638110 | 5/1950 | United Kingdom . |
| 730272 | 5/1955 | United Kingdom . |

Primary Examiner—Deborah Yee
Attorney, Agent, or Firm—Nikaido, Marmelstein, Murray & Oram

[57] ABSTRACT

A composite roll including a metal core and a hard face formed from a steel composition including the elements carbon, manganese, silicon, chromium, molybdenum, niobium, vanadium and iron in specified amounts, as well as incidental impurities. The composition may optionally further include tungsten, nickel, tantalum and/or titanium. The composite roll may further comprise a buffer layer.

11 Claims, No Drawings

COMPOSITE ROLL

The present invention relates to a composite roll having a metal core and a hardface formed from a steel composition, the steel composition per se, and a method of heat treatment of the composite roll after the composite roll has been formed by welding a layer of the steel composition to the metal core.

The present invention relates particularly, although by no means exclusively, to rolls used in the production of rails and structural steel.

The main requirements for such rolls are wear resistance and toughness. The rolls are usually chill cast from steel-based or iron-based materials. However, the cast rolls tend to be susceptible to damage, particularly chipping, and often require replacement before the maximum life of the cast rolls has been reached. In this regard, cast rolls cannot be repaired and thus once damaged must be replaced.

It is an object of the present invention to provide an improved roll which alleviates the disadvantages of conventional chill cast rolls described in the preceding paragraph.

The present invention is based on the realisation that an improved roll can be formed as a composite roll comprising a metal core and a wear resistant and tough hardface of a particular steel composition, as described below.

According to the present invention there is provided a steel composition suitable for use to form a hardface of a composite roll comprising a metal core and the hardface, the steel composition comprising the elements carbon, manganese, silicon, chromium, molybdenum, niobium and vanadium in the amounts specified below, in wt.%:

|     |             |
| --- | ----------- |
| C:  | 0.35 to 1.2 |
| Mn: | 0.3 to 3.0  |
| Si: | 0.3 to 2.0  |
| Cr  | 5.0 to 11.5 |
| Mo: | 0.3 to 5.0  |
| Nb: | 0.4 to 5.0  |
| V:  | 0.3 to 3.0  | and the balance iron and incidental impurities.

The preferred amount in wt.% of the elements carbon, manganese, silicon, chromium, molybdenum, niobium and vanadium in the steel composition is as follows:

|     |              |
| --- | ------------ |
| C:  | 0.45 to 0.90 |
| Mn: | 1.8 to 2.2   |
| Si: | 0.8 to 1.1   |
| Cr: | 5.6 to 6.5   |
| Mo: | 1.5 to 2.0   |
| Nb: | 1.7 to 2.2   |
| V:  | 0.7 to 1.0   |

It is preferred that the composition further comprises 1.0 to 3.0 wt.% tungsten. It is particularly preferred that the composition comprises 1.3 to 1.5 wt.% tungsten.

It is preferred that the amount of carbon in the steel composition is in the range 0.45 to 0.65 wt.%. It is preferred particularly that the amount of carbon is in the range 0.55 to 0.57 wt.%.

The incidental impurities may comprise titanium, phosphorus, sulphur, nickel and copper in the amounts specified below in wt.%:

|     |           |
| --- | --------- |
| Ti: | 0.05 max. |
| P:  | 0.03 max. |
| S:  | 0.02 max. |
| Ni: | 0.05 max. |
| Cu: | 0.03 max. |
| Al: | 0.05 max. |
| Ta: | 0.05 max. |

The steel composition may include the elements nickel, tantalum, and titanium in the amounts specified below in wt.%.

|     |             |
| --- | ----------- |
| Ni: | up to 3     |
| Ta: | 0.01 to 0.2 |
| Ti: | 0.01 to 0.2 |

It is believed, although it has not been established with certainty at this stage, that the important elements in the steel composition from the viewpoint of wear resistance and toughness are niobium and vanadium. It has been found unexpectedly that the inclusion of vanadium in the amounts specified above disperses the niobium carbides into a plurality of small discrete grains and, as a consequence, the steel composition has improved wear resistance and toughness. It has also been found that the inclusion of the niobium and vanadium in the amounts specified above is synergistic in that the improvement in the wear resistance and toughness is greater than would normally be expected.

According to the present invention there is also provided a composite roll comprising, a metal core and a hardface formed from the steel composition described above.

It is preferred that the metal core is formed from a plain carbon steel composition comprising the elements carbon and manganese in the amounts set out below, in wt.%:

|     |              |
| --- | ------------ |
| C:  | 0.10 to 0.44 |
| Mn: | 0.30 to 1.80 | and the balance iron and incidental impurities.

The incidental impurities may comprise sulphur and phosphorus in amounts up to 0.05 wt.%.

It is preferred that the composite roll further comprises a buffer layer intermediate the hardface and the metal core.

It is preferred particularly that the buffer layer is formed from a steel composition comprising the elements carbon, silicon, manganese, chromium, molybdenum and niobium in the amounts specified below, in wt.%.

|     |      |
| --- | ---- |
| C:  | 0.04 |
| Si: | 0.65 |
| Mn: | 1.2  |
| Cr: | 1.3  |
| Mo: | 1.0  |
| Nb: | 1.7  |

According to the present invention there is also provided a method of forming the composite roll described above comprising, welding the steel composition onto the metal core thereby to form the hardface.

It is preferred that the welding is carried out at a temperature which is sufficient to allow the steel composition to be deposited on the metal core in the austenite phase. Typically, the temperature is in excess of 250° C. The preferred temperature is in the range of 450° C. to 550° C.

It is preferred that after the composite roll is formed in accordance with the method described above the composite roll is heat treated in accordance with the following schedule:

(a) in a stress relieving stage,
 (i) heating the composite roll at a rate of 40° C. to 100° C./hour from the welding temperature to within a range of temperatures at which the microstructure of the hardface can stress relieve;
 (ii) holding the composite roll within the range of temperatures for a sufficient time to allow the microstructure to at least partially stress relieve; and
 (iii) air cooling the composite roll to room temperature to at least partially transform the austenite phase to the martensite phase;

(b) in a first tempering stage,
 (i) heating the composite roll at a rate of 40° C. to 100° C./hour to within a range of temperatures to allow the microstructure to temper;
 (ii) holding the composite roll within the range of temperatures for a sufficient time to allow at least partial tempering; and
 (iii) air cooling the composite roll to room temperature; and (c) in a second tempering stage,
 (i) heating the composite roll at a rate of 40° C. to 100° C./hour to within a range of temperatures to allow the microstructure to temper;
 (ii) holding the composite roll within the range of temperatures for a sufficient time to allow at least partial tempering; and
 (iii) air cooling the composite roll to room temperature.

It is preferred that in the stress relieving stage the composite roll is heated to a temperature within the range 600 to 650° C. Typically, the composite roll is held at the temperature for two hours per 10 mm weld deposit thickness.

It is preferred that in the tempering stage the composite roll is heated to a temperature within the range 400° C. to 700° C. It is preferred particularly that the composite roll is heated to a temperature within the range 450° C. to 550° C. Typically, the composite roll is held at a temperature for two hours per 10 mm weld deposit thickness.

It is preferred particularly that the temperature and time for the tempering stage are selected to allow secondary hardening of the microstructure.

It is preferred that the composite roll undergoes rough machining between the first and the second stages.

The results of an evaluation of roller straightner rolls formed in accordance with the present invention are set out below.

1. The welded hardfaces wore at the same rate as chill cast rolls.
2. The welded hardfaces were tougher and therefore less susceptible to chipping than chill cast rolls.
3. The rolls were less expensive than chill cast rolls.
4. The rolls were repairable and recyclable.
5. A hardface deposit could be produced which is thicker than the chilled materials on cast rolls. As a consequence, longer service life of the rolls would be expected.

Many modifications may be made without departing from the spirit and scope of the invention.

In this regard, whilst the present invention as described above is concerned particularly with roller straightener rolls it can readily be appreciated that the present invention is not so limited and extends to rolls for other applications which require the properties of wear resistance and toughness provided by the hardface formed by the steel composition.

Furthermore it can readily be appreciated that on a broader level the present invention extends to the steel composition per se and is not restricted to the use of the steel composition to form a hardface on the composite roll.

We claim:

1. A composite roll comprising a metal core and a hard face formed from a steel composition comprising the elements carbon, manganese, silicon, chromium, molybdenum, niobium and vanadium in the amount specified below, in weight %:

| | |
|---|---|
| C: | 0.45 to 0.90 |
| Mn: | 1.8 to 2.2 |
| Si: | 0.8 to 1.1 |
| Cr: | 5.6 to 6.5 |
| Mo: | 1.5 to 2.0 |
| Nb: | 1.7 to 2.2 |
| V: | 0.7 to 1.0 | and the balance iron and incidental impurities.

2. The composite roll defined in claim 1, wherein the amount of carbon in the steel composition is in the range 0.45 to 0.65 wt. %.

3. The composite roll defined in claim 2, wherein the amount of carbon is in the range 0.55 to 0.57 wt. %.

4. The composite roll defined in any one of claims 1 to 3, wherein the steel composition further comprises 1.0 to 3.0 wt. % tungsten.

5. The composite roll defined in claim 4, wherein the amount of tungsten is in the range of 1.3 to 1.5 wt %.

6. The composite roll defined in any one of claims 1 to 3, wherein the steel composition further comprises nickel, tantalum, and titanium in the amount specified below in wt. %

| | |
|---|---|
| Ni: | up to 3 |
| Ta: | 0.01 to 0.2 |
| Ti: | 0.01 to 0.2. |

7. The composite roll defined in claim 4, wherein the steel composition further comprises nickel, tantalum, and titanium in the amounts specified below in wt. %

| | |
|---|---|
| Ni: | up to 3 |
| Ta: | 0.01 to 0.2 |
| Ti: | 0.01 to 0.2. |

8. The composite roll defined in claim 5, wherein the steel composition further comprises nickel, tantalum and titanium in the amounts specified below in wt. %

|     |              |
| --- | ------------ |
| Ni: | up to 3      |
| Ta: | 0.01 to 0.2  |
| Ti: | 0.01 to 0.2. |

9. The composite roll defined in claim 1, wherein the metal core is formed from a plain carbon steel composition comprising the elements carbon and manganese in the amounts set out below, in wt.%:

|     |              |
| --- | ------------ |
| C:  | 0.10 to 0.44 |
| Mn: | 0.30 to 1.80 | and the balance iron and incidental impurities.

10. The composite roll defined in claim 1, further comprising a buffer layer intermediate and hardface and the metal core.

11. The composite roll defined in claim 10, wherein the buffer layer is formed from a steel composition comprising the elements carbon, silicon, manganese, chromium, molybdenum and niobium in the amounts specified below, in wt.%.

|     |      |
| --- | ---- |
| C:  | 0.04 |
| Si: | 0.65 |
| Mn: | 1.2  |
| Cr: | 1.3  |
| Mo: | 1.0  |
| Nb: | 1.7  |

* * * * *